(12) United States Patent
Liu

(10) Patent No.: US 6,622,715 B2
(45) Date of Patent: Sep. 23, 2003

(54) BARBECUE

(76) Inventor: George C. M. Liu, No. 1-10, Hsing-Chung Rd., Tou-Nan Chen, Yunlin Hsien (TW)

( * ) Notice: Subject to any disclaimer, the term of this patent is extended or adjusted under 35 U.S.C. 154(b) by 246 days.

(21) Appl. No.: 09/927,080

(22) Filed: Aug. 9, 2001

(65) Prior Publication Data

US 2003/0029434 A1 Feb. 13, 2003

(51) Int. Cl.⁷ .................................................. A47J 37/00
(52) U.S. Cl. ..................... 126/25 R; 126/25 A; 126/9 R
(58) Field of Search .............................. 126/25 R, 25 A, 126/9 R, 41 R, 30, 275 R

(56) References Cited

U.S. PATENT DOCUMENTS

| | | | | |
|---|---|---|---|---|
| 3,490,433 A | * | 1/1970 | Busenbarrick | 126/9 R |
| 5,243,961 A | * | 9/1993 | Harris | 126/9 R |
| 5,333,540 A | * | 8/1994 | Mazzocchi | 99/421 H |
| 6,439,111 B1 | * | 8/2002 | Lu | 99/449 |
| 6,467,474 B2 | * | 10/2002 | Hermansen et al. | 126/25 R |
| 6,532,951 B1 | * | 3/2003 | Sallie et al. | 126/506 |

* cited by examiner

Primary Examiner—Alfred Basichas
(74) Attorney, Agent, or Firm—Alan D. Kamrath; Rider Bennett, LLP.

(57) ABSTRACT

A barbecue has a hollow body with a front wall, a rear wall, two sidewalls and a bottom. The body has a pair of support edges formed at a top thereof and a first cooking grill placed on the support edges. A U-like seat is provided in the body and has two opposite ends secured to the body and two opposite sidewalls spaced apart from the body. Two pairs of steps are formed at the sidewalls of the seat, wherein the first pair of steps is below the second pair of steps. A charcoal grill is placed on the first pair of steps, and a second cooking grill is placed on the second pair of steps. Whereby, the heat generated by burning charcoal does not directly transmit to the body spaced apart from the seat, and the body will not be prematurely corroded and has a long use life.

15 Claims, 5 Drawing Sheets

BARBECUE

BACKGROUND OF THE INVENTION

1. Field of the Invention

The present invention is related to a barbecue, and more particularly to a barbecue wherein a heat source within the barbecue is isolated from outer walls of the barbecue such that burn injuries are unlikely when using the barbescue

2. Description of Related Art

Conventional barbecues in use have very high temperatures as heat generated by burning charcoals is directly transmitted to bodies of the barbecue. Under high temperatures, the bodies of the barbecues will be corroded quickly and accordingly strength of the barbecues are weakened. Thus, the use life of the barbecues will not be long.

Therefore, the invention provides an improved barbecue to mitigate and/or obviate the aforementioned problems.

SUMMARY OF THE INVENTION

The main objective of the invention is to provide a barbecue in which heat generated by burning charcoals is not directly transmitted to a body of the barbecue. Other objects, advantages and novel features of the invention will become more apparent from the following detailed description when taken in conjunction with the accompanying drawings.

DETAILED DESCRIPTION OF THE PREFERRED EMBODIMENT

Figure 1:
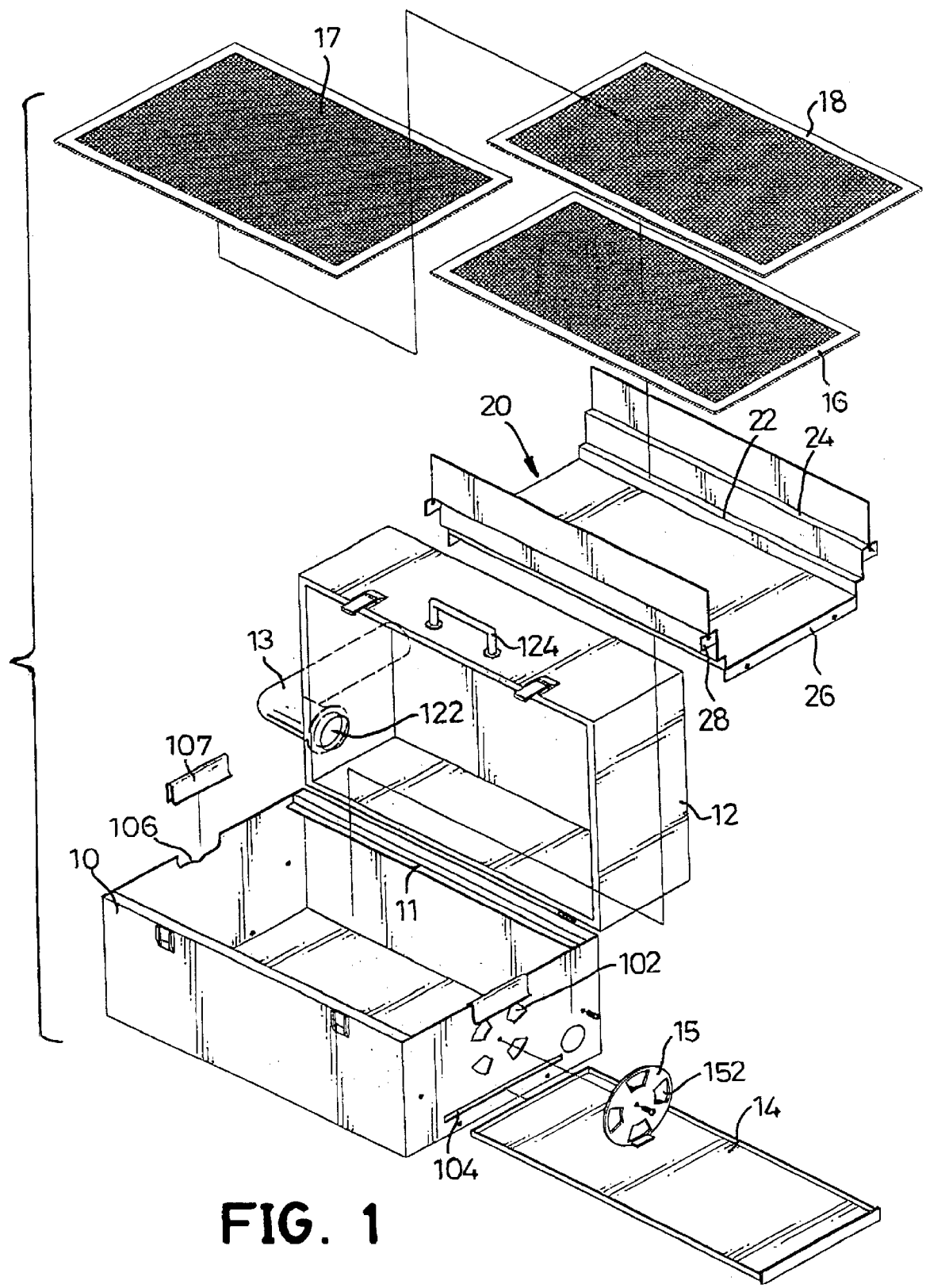
FIG. 1 is an exploded perspective view of a barbecue in accordance with the invention.
Figure 2:
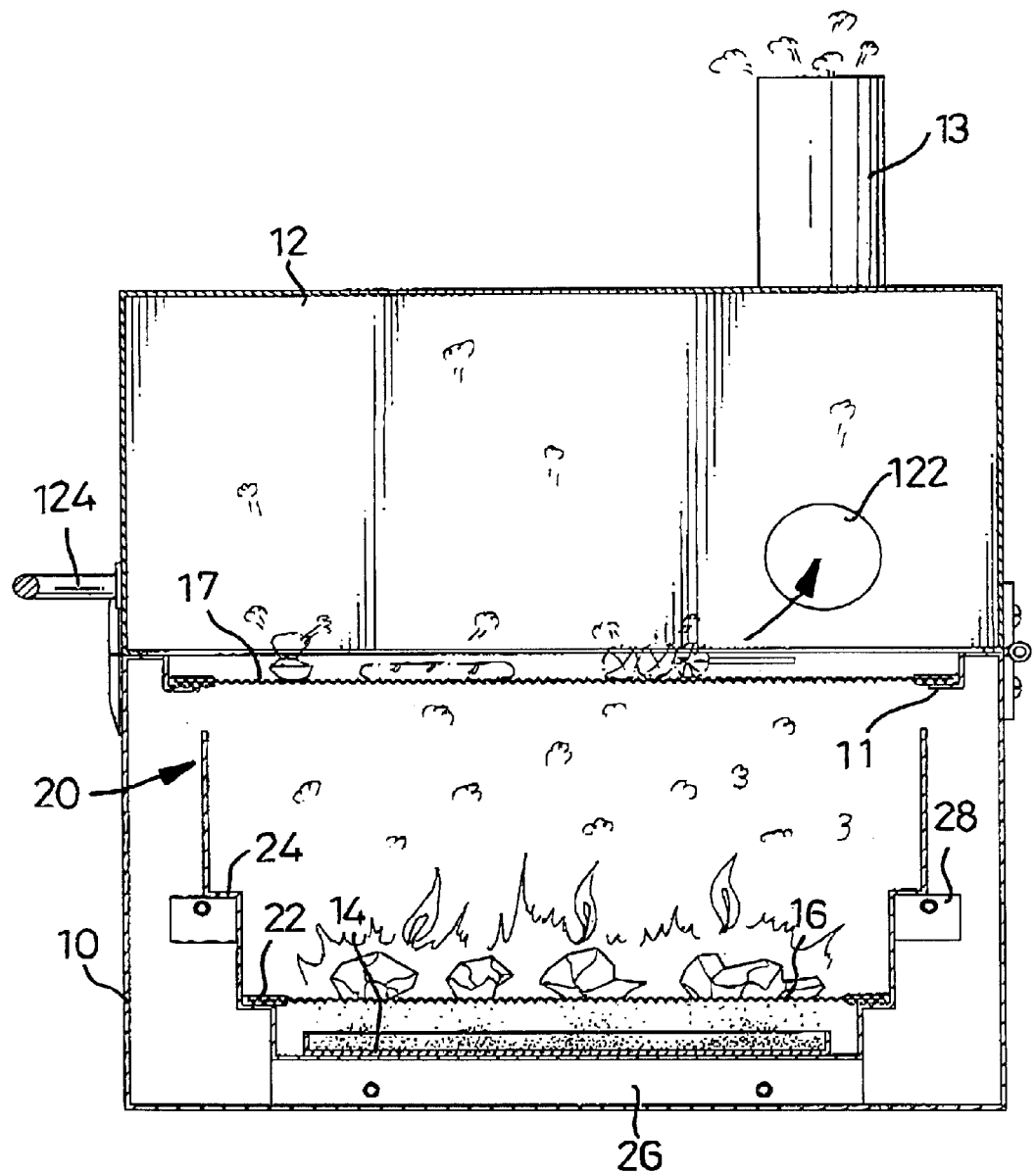
FIG. 2 is a side sectional view of the barbecue in accordance with the invention.

Referring to FIGS. 1 and 2, a barbecue in accordance with the invention has a hollow body (10) formed with two sidewalls, a front wall, a rear wall and a bottom. A cover (12) is pivotally mounted at the rear wall of the body (10). Two support edges (11) are oppositely formed at tops of the front wall and the rear wall to support a first cooking grill (17) on the body (10). The cover (12) has a hole (122) defined therethrough and a funnel (13) provided thereon and in communication with the hole (122). A handle (124) is provided on the cover (12) at a front side opposite to the pivoted side. A pair of fasteners (not numbered) is provided beside the handle (124) for securing the cover (12) on the body (10).

A U-like seat (20) is secured in the body (10) and has two pairs of steps (22, 24) respectively formed on an inner wall thereof, wherein the first pair of steps (22) is below the second pair of steps (24). A charcoal grill (16) is placed on the first pair of steps (22) and a second cooking grill (18) is placed on the second pair of steps (24). Each end of the seat (20) further has a skirt (26) extending downwards and two ears (28) extending outwards. Screws (not numbered) are respectively inserted through the skirt (26) and the ears (28) to secure the seat (20) to the body (10). At the same time, the seat (20) is spaced apart from the bottom and the inner walls of the body (10).

A plurality of first apertures (102) is defined at a sidewall of the body (10) and a rotary disk (15) is provided on the sidewall and has the identical plurality of second apertures (152) defined therethrough to corresponding to the first apertures (102). When the rotary disk (15) is turned relative to the body (10), the first apertures (102) can be completely closed, partially opened or completely opened to adjust air flowing into the body (10).

An ash tray (14) is provided at a bottom of the seat (20) and inserted in the body (10) via a slot (104) defined below the first apertures (102). When the ash tray (14) is fill of ash, it can be taken out for cleaning via the slot (104).

Figure 3:
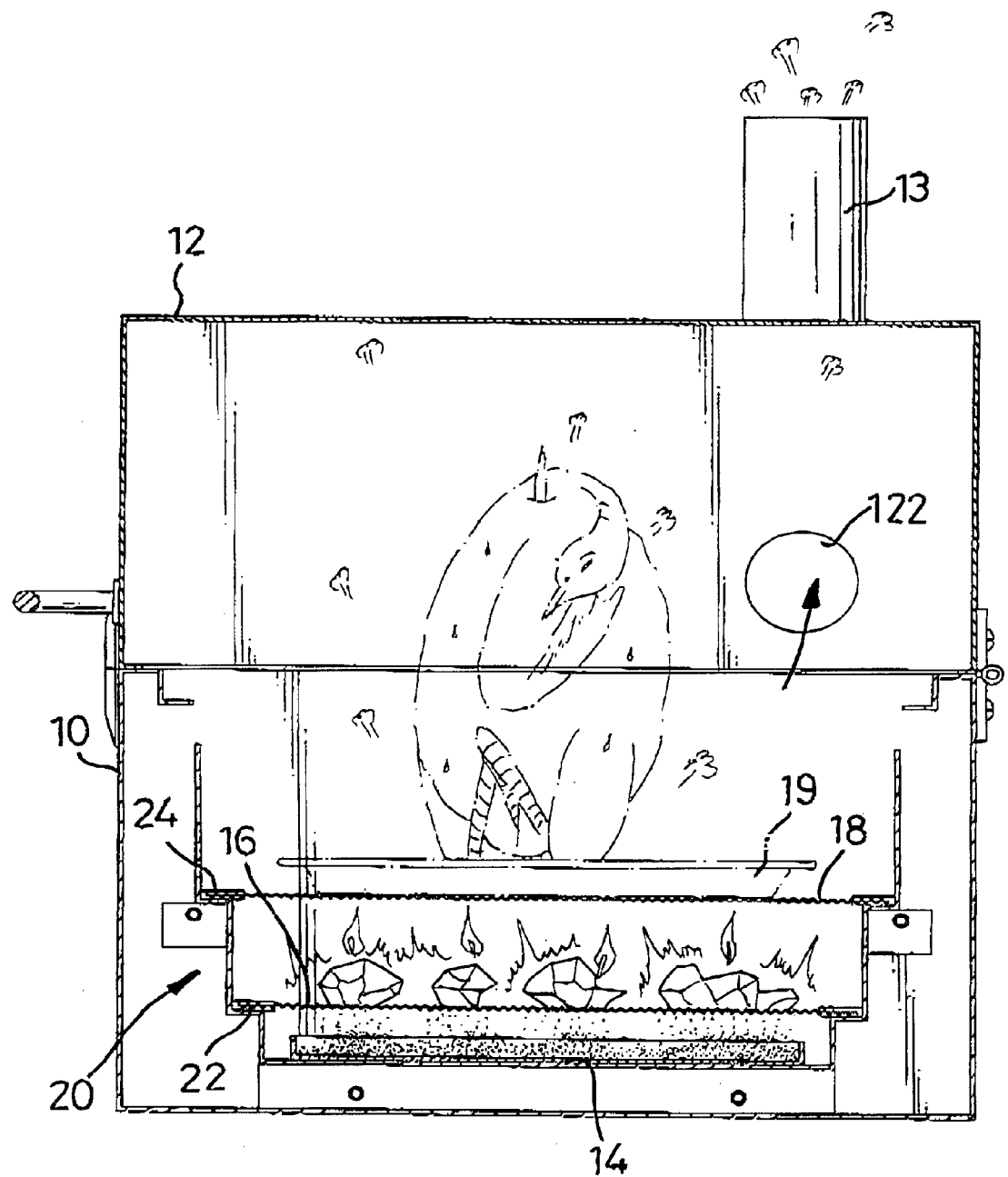
FIG. 3 is another side sectional view of the barbecue in use.

Referring to FIGS. 2 and 3, in use, burning charcoal is placed on the charcoal grill (16), and the first cooking grill (17) or the second cooking grill (18) is placed on the support edges (11) or the second steps (24). Food items are placed on the cooking grills (17, 18) and barbecued by the burning charcoal under the grills (17, 18). In the case of cooking a large food item such as a chicken or a duck, the first cooking grill (17) is removed and the chicken or duck is put on a pan (19) placed on the second grill (18) for barbecuing. In the process of barbecuing, the cover (12) is lowered to join the body (10) to effectively retain the heat in the body (10). Outside air flows in the body (10) via the first apertures (102) and second apertures (152), and hot air in the body (10) flows out via the hole (122) and the funnel (13) to form an air-convection to facilitate the burning of the charcoal.

Figure 4:
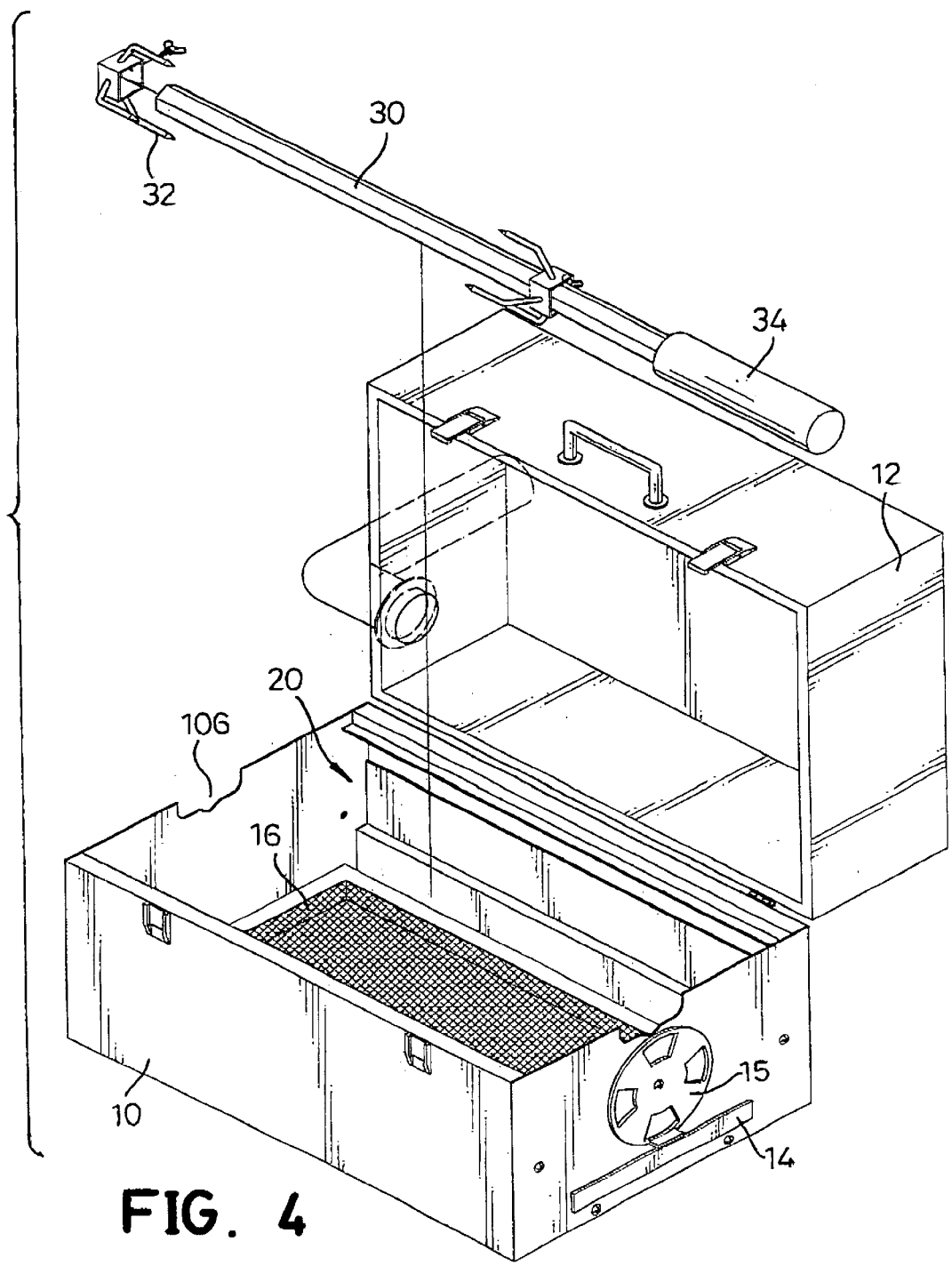
FIG. 4 is a perspective view showing that a bar with fork is rested on a body.
Figure 5:
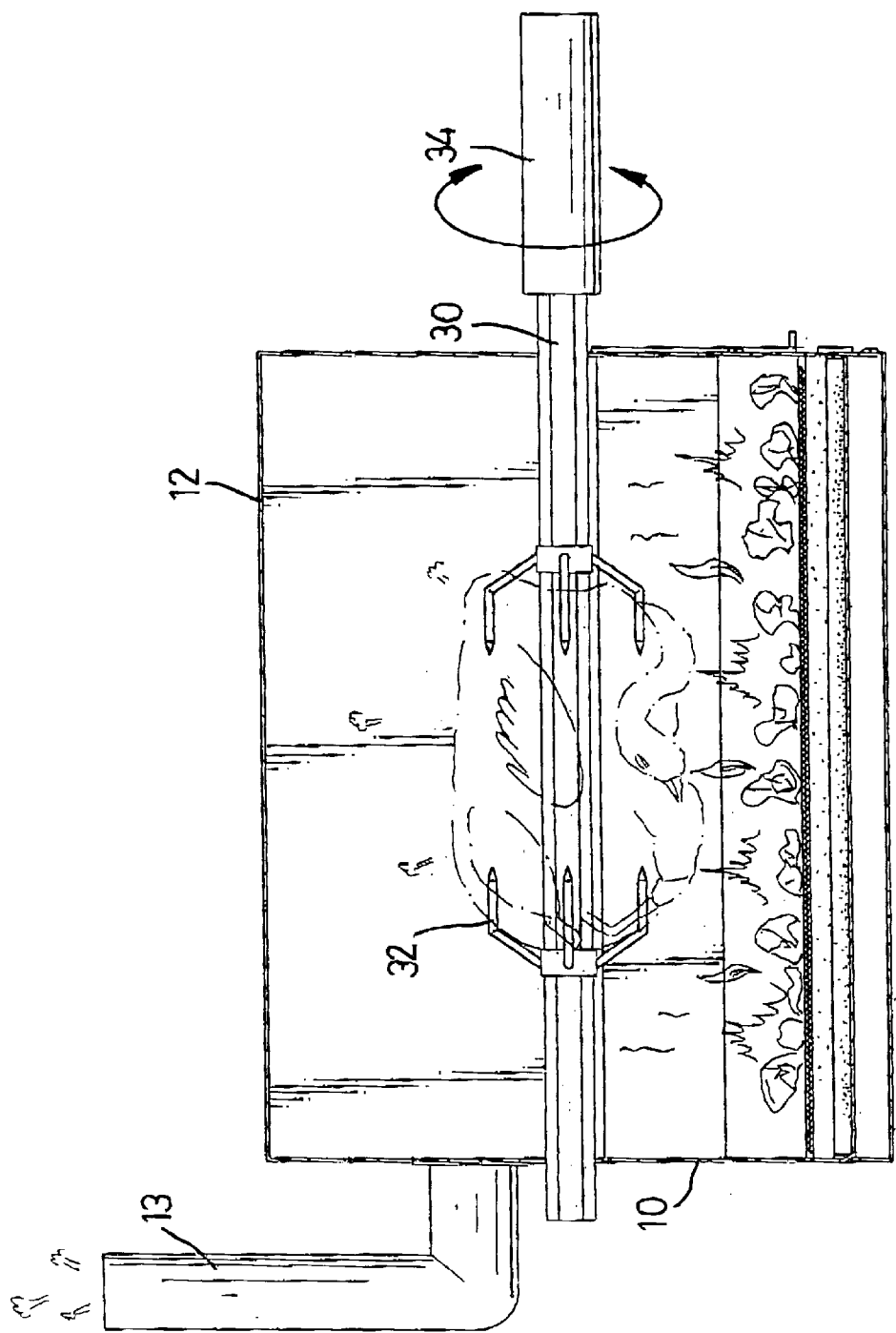
FIG. 5 is a top view showing that food skewered on the bar is being cooked.

Referring to FIGS. 4 and 5, the body (10) further has two notches (106) respectively defined at tops of the sidewalls of the body (10). A bar (30) is rested in the notches (106) and has two forks (32) movably provided thereon. Food items can be skewered on the bar (30) for cooking A grip (34) is formed at an end of the bar (30) to enable a user to tam the bar (30) during cooking. Furthermore, when the bar (30) is removed, two patches (108) which have an inverted U-like section arc respectively provided on the tops of the sidewall of the body (10) to cover the notches (106), as shown in FIG. 1.

Because the seat (20) is spaced apart from the body (10), the heat generated by burning charcoal will not directly transmit to the body (10) and the temperature of the body (10) will not be very high. Therefore, users will not be burned, and the body (10) will not be prematurely corroded whereby the barbecue has a long and useful life. The outer wall of the body (10) isolated from the heat source in the body (10) will not be scorch and can retain smooth and shining. Moreover, it is very simple and convenient to assemble the seat (20) to the body (10) by screws engaged to the skirts (26) and ears (28).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to die fill extent indicated by the broad general meaning of the terms in which the appended claims are expressed.

What is claimed is:

1. A barbecue comprising:
    a hollow body (10), the body (10) having a pair of support edges (11) formed at a top thereof and a first cooking grill (17) placed on the support edges (11); and a U-like seat (20) provided in the body (10), the seat (20) having two opposite ends secured to the body (10) and two opposite sidewalls spaced apart from the body (10), and a pair of first steps (22) formed at the sidewalls thereof, and a charcoal grill (16) placed on the first pair of steps (22), whereby heat emanating from a heat source deposited on the U-like seat is effectively isolated from the hollow body.

2. The barbecue as claimed in claim 1, wherein the seat (20) has a pair of second steps (24) formed at the sidewalls and above the first steps (22), and a second cooking grill (18) placed on the second pair of steps (24).

3. Tie barbecue as claimed in claim 1, wherein the seat (20) has an extending downwards skirt (26) and two extending outwards ears (28) formed at each end thereof, and is secured to the body (10) by screws extended through the skirts (26) and the ears (28).

4. The barbecue as claimed in claim 1 further comprising a cover (12) pivotally mounted on the body (10).

5. The barbecue as claimed in claim 4, wherein the cover (12) has a hole (122) defined therethrough, and a funnel (13) provided thereon and in communication with the hole (122).

6. The barbecue as claimed in claim 4, wherein the cover (12) has a handle (124) provided at a side opposite to the pivoted side thereof.

7. The barbecue as claimed in claim 4, wherein the cover (12) has at least one fastener provided beside the handle (124) to secure the cover (12) to the body (10).

8. The barbecue as claimed in claim 1, wherein the body (10) has a plurality of first apertures (102) defined through a sidewall thereof.

9. The barbecue as claimed in claim 8, wherein the body (10) has a rotary disk (15) provided thereon and having an identical plurality of second apertures (152) corresponding to the first apertures (102).

10. The barbecue as claimed in claim 5, wherein the body (10) has a plurality of first apertures (102) defined through a sidewall thereof.

11. The barbecue as claimed in claim 10, wherein the body (10) has a rotary disk (15) provided thereon and having an identical plurality of second apertures (152) corresponding to the first apertures (102).

12. The barbecue as claimed in claim 1, wherein the body (10) has a slot (104) defined through a sidewall thereof, and the seat (20) has an ash tray (14) provided at the bottom thereof and inserted in the body (10) via the slot (104).

13. The barbecue as claimed in claim 1, wherein the body (10) has two notches (106) respectively defined at tops of the sidewalls thereof, and a bar (30) is rested in the notches (106) and has two forks (32) movably provided thereon.

14. The barbecue as claimed in claim 13, wherein the bar (30) has a grip (34) provided at an end thereof.

15. The barbecue as claimed in claim 13, wherein the body (10) has two patches (108) provided on the tops of the sidewall to cover the notches (106) when the bar (30) is removed.

* * * * *